United States Patent
Vojak

(10) Patent No.: US 9,007,613 B2
(45) Date of Patent: Apr. 14, 2015

(54) SECURE MOBILE PRINTING METHOD AND SYSTEM

(75) Inventor: William John Vojak, Battle Ground, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 292 days.

(21) Appl. No.: 13/200,448

(22) Filed: Sep. 23, 2011

(65) Prior Publication Data

US 2013/0077124 A1 Mar. 28, 2013

(51) Int. Cl.
*G06K 15/00* (2006.01)
*G06F 3/12* (2006.01)
*H04N 1/00* (2006.01)
*H04N 1/32* (2006.01)
*H04N 1/44* (2006.01)

(52) U.S. Cl.
CPC ........ *G06F 3/1205* (2013.01); *H04N 2201/328* (2013.01); *H04N 1/00233* (2013.01); *H04N 1/00307* (2013.01); *H04N 1/32117* (2013.01); *H04N 1/4413* (2013.01); *H04N 1/444* (2013.01); *H04N 2201/0084* (2013.01); *H04N 2201/3269* (2013.01); *H04N 2201/3278* (2013.01); *H04N 2201/3221* (2013.01); *H04N 2201/0082* (2013.01); *H04N 2201/3205* (2013.01); *G06F 3/1222* (2013.01); *G06F 3/1238* (2013.01); *G06F 3/1292* (2013.01)

(58) Field of Classification Search
None
See application file for complete search history.

(56) References Cited

U.S. PATENT DOCUMENTS

| 7,667,865 B2* | 2/2010 | Ciriza et al. | 358/1.15 |
|---|---|---|---|
| 7,792,298 B2 | 9/2010 | Silverbrook et al. | |
| 8,301,898 B2* | 10/2012 | Kishi | 713/182 |
| 2003/0101342 A1* | 5/2003 | Hansen | 713/167 |
| 2003/0114176 A1* | 6/2003 | Phillipps | 455/500 |
| 2003/0163384 A1 | 8/2003 | Hendra | |
| 2003/0213843 A1 | 11/2003 | Jackson | |
| 2003/0231329 A1* | 12/2003 | Edmonds et al. | 358/1.13 |
| 2004/0137855 A1* | 7/2004 | Wiley et al. | 455/88 |
| 2005/0270567 A1* | 12/2005 | Du et al. | 358/1.15 |
| 2006/0139685 A1* | 6/2006 | Hayashi | 358/1.15 |
| 2007/0104525 A1* | 5/2007 | Isshiki | 400/62 |
| 2007/0182985 A1* | 8/2007 | Ciriza et al. | 358/1.15 |
| 2007/0182986 A1* | 8/2007 | Ciriza et al. | 358/1.15 |
| 2008/0137121 A1 | 6/2008 | Chrisop et al. | |
| 2008/0231890 A1* | 9/2008 | Kishi | 358/1.15 |

(Continued)

FOREIGN PATENT DOCUMENTS

| JP | 2004126942 | 4/2004 |
|---|---|---|
| JP | 2010218186 | 9/2010 |
| WO | WO 0209362 A1 * | 1/2002 |

*Primary Examiner* — Hilina K Demeter
(74) *Attorney, Agent, or Firm* — Scot A. Reader

(57) ABSTRACT

A secure mobile printing method and system allow a user to unlock remotely submitted print jobs without having to remember job identifiers and without imposing onerous barcoding requirements on printer firmware or requiring the user to scroll through a list of print jobs on a printer's front panel display screen. An exemplary method, performed on a mobile device, comprises initiating a print job, assigning a job identifier for the print job, selecting a printer for the print job, sending to the selected printer the print job and the job identifier whereby the print job is locked on the selected printer, imaging a printed printer identification code (PIC) on an exposed surface of the selected printer, resolving the printed PIC image to the job identifier, and sending to the selected printer the job identifier whereby the print job is unlocked.

5 Claims, 6 Drawing Sheets

(56) References Cited

U.S. PATENT DOCUMENTS

| | | |
|---|---|---|
| 2008/0262649 A1 | 10/2008 | Allinson et al. |
| 2009/0000969 A1* | 1/2009 | Walker et al. ................. 206/307 |
| 2009/0066998 A1* | 3/2009 | Kato ............................. 358/1.15 |
| 2010/0144376 A1* | 6/2010 | Pawlecki et al. ........... 455/456.6 |
| 2010/0225962 A1* | 9/2010 | Okigami et al. ............. 358/1.15 |
| 2010/0231958 A1* | 9/2010 | Okigami ....................... 358/1.15 |
| 2010/0309510 A1* | 12/2010 | Hansen ......................... 358/1.15 |
| 2011/0026069 A1* | 2/2011 | Jesudason et al. ........... 358/1.15 |
| 2012/0229843 A1* | 9/2012 | Golle et al. .................. 358/1.15 |
| 2012/0250065 A1* | 10/2012 | Partridge et al. ............. 358/1.14 |
| 2012/0287460 A1* | 11/2012 | McMillin et al. ............ 358/1.15 |

* cited by examiner

SECURE MOBILE PRINTING METHOD AND SYSTEM

BACKGROUND OF THE INVENTION

The present invention relates to mobile printing and, more particularly, to preventing unauthorized access to print jobs sent to printers from mobile devices remote from the printers.

Mobile printing systems allow a user to send a print job to a printer from a mobile device remote from the printer. For example, a salesperson who is on the road for several days may send a print job to a printer at the corporate office from his or her tablet computer or smart phone, with the idea of picking-up the printed document upon his or her return to the office. However, if the print job is printed before the user returns to the printer, sensitive data may be compromised and/or the printed document may be discarded. On the other hand, if the print job is left in the job queue while awaiting the user's return, it may be canceled by another user.

To avoid these problems, some mobile printing systems assign remotely submitted print jobs a unique job identifier and require the user who sent the print job to input the job identifier, either on the mobile device or the printer's front panel, to unlock the print job before it can be printed or canceled. While these systems prevent unauthorized access to remotely submitted print jobs, they require users to remember the job identifiers. This can be taxing on users who have been on travel for a long time or remotely submitted numerous print jobs.

An alternative system that relieves users of the burden to remember job identifiers assigns each remotely submitted print job a unique job identifier and encodes the job identifier into a unique barcode. When the user who remotely submitted the print job returns to the printer, the user scrolls through a list of print jobs on the printer's front panel display screen. Each record in the list provides details of a print job along with the barcode for the print job. When the user locates his or her print job in the list, the user images the barcode for the print job using a camera on the user's mobile device. The mobile device then decodes the barcode to reveal the job identifier of the print job and sends the job identifier to the printer to unlock the print job. While this alternative system does not require the user to remember job identifiers, it does require the printer firmware to generate, manage and display a unique barcode for each remotely submitted print job. Moreover, it requires the user to scroll through a list of print jobs on the printer's front panel display screen to find and photograph the barcode for his or her print job. Additionally, if the user has remotely submitted multiple print jobs to the printer, the user must separately locate and photograph the barcode for each print job.

SUMMARY OF THE INVENTION

The present invention provides a secure mobile printing method and system that allow a user to unlock remotely submitted print jobs without having to remember job identifiers and without imposing onerous barcoding requirements on printer firmware or requiring the user to scroll through a list of print jobs on a printer's front panel display screen.

In one aspect of the invention, a secure mobile printing method comprises the steps of initiating on a mobile device a print job; assigning on the mobile device a job identifier for the print job; selecting on the mobile device from a plurality of printers a printer for the print job; sending from the mobile device to the selected printer the print job and the job identifier whereby the print job is locked on the selected printer; imaging by the mobile device a printed printer identification code (PIC) for the selected printer on an exposed surface of the selected printer; resolving on the mobile device the printed PIC image to the job identifier; and sending from the mobile device to the selected printer the job identifier whereby the print job is unlocked on the selected printer.

In some embodiments, the resolving step comprises the substeps of resolving the printed PIC image to a printer identification text string for the selected printer; and resolving the printer identification text string for the selected printer to the job identifier.

In some embodiments, the method further comprises the step of displaying on the mobile device details of the print job in response to the resolving step.

In some embodiments, the method further comprises the step of receiving on the mobile device a request to print the print job in response to the displaying step.

In some embodiments, the method further comprises the step of receiving on the mobile device a request to cancel the print job in response to the displaying step.

In some embodiments, the method further comprises the step of printing the unlocked print job on the selected printer.

In some embodiments, the method further comprises the step of canceling the unlocked print job on the selected printer.

In some embodiments, the method further comprises the step of identifying on the mobile device the print job as a secure print job.

In some embodiments, the method further comprises the step of associating on the mobile device the job identifier with a printer identification text string for the selected printer.

In some embodiments, the method further comprises the step of generating on the mobile device a thumbnail image of a first page of the print job.

In some embodiments, the details comprise an initiation date and time for the print job.

In some embodiments, the details comprise a thumbnail image of a first page of the print job.

In some embodiments, the PIC is a barcode.

In another aspect of the invention, a secure mobile printing method comprises the steps of initiating on a mobile device a first print job and a second print job; assigning on the mobile device a first job identifier for the first print job and a second job identifier for the second print job; selecting on the mobile device from a plurality of printers a printer for the first print job and the second print job; sending from the mobile device to the selected printer the first print job and the first job identifier whereby the first print job is locked on the selected printer; sending from the mobile device to the selected printer the second print job and the second job identifier whereby the second print job is locked on the selected printer; imaging by the mobile device a printed PIC for the selected printer on an exposed surface of the selected printer; resolving on the mobile device the printed PIC image to the first job identifier and the second job identifier; and sending from the mobile device to the selected printer the first job identifier whereby the first print job is unlocked on the selected printer and the second job identifier whereby the second print job is unlocked on the selected printer.

In yet another aspect of the invention, a mobile device comprises a processor; a user interface communicatively coupled with the processor; a network interface communicatively coupled with the processor; and a camera communicatively coupled with the processor, wherein in response to input on the user interface the mobile device under control of the processor initiates a print job, assigns a job identifier for the print job, selects from a plurality of printers a printer for the print job and sends to the selected printer via the network interface the print job and the job identifier whereby the print job is locked on the selected printer, and wherein in response to further input on the user interface the camera under control of the processor images a printed PIC for the selected printer on an exposed surface of the selected printer whereupon the mobile device under control of the processor resolves the printed PIC image to the job identifier and sends to the selected printer via the network interface the job identifier whereby the print job is unlocked on the selected printer.

In yet another aspect of the invention, a secure mobile printing system comprises a plurality of printers each having a unique printed PIC on an exposed surface and a mobile device communicatively coupled with the printers, wherein in response to user input on the mobile device the mobile device initiates a print job, assigns a job identifier for the print job, selects from the plurality of printers a printer for the print job and sends to the selected printer the print job and the job identifier whereby the print job is locked on the selected printer, and wherein in response to further user input the mobile device images the printed PIC on the exposed surface of the selected printer whereupon the mobile device resolves the printed PIC image to the job identifier and sends to the selected printer the job identifier whereby the print job is unlocked on the selected printer.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
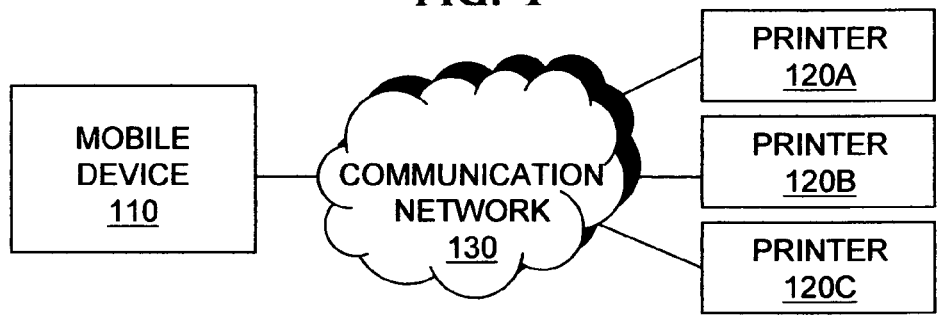
FIG. 1 is a block diagram showing a secure mobile printing system in some embodiments of the invention.

FIG. 1 shows a secure mobile printing system in some embodiments of the invention. The system includes a mobile device 110 remotely coupled with a plurality of printers 120A, 120B, 120C via a communication network 130. Communication network 130 includes communication links interconnected by connecting devices such as Internet Protocol routers, Ethernet switches, wireless local area network (Wi-Fi) access points, wireless metropolitan area network (WiMAX) access points and/or cellular base stations that communicatively couple mobile device 110 and printers 120A, 120B, 120C. Mobile device 110 remotely submits secure print jobs to selected ones of printers 120A, 120B, 120C over communication network 130. These secure print jobs are locked on the selected printer until being unlocked by mobile device 110. Mobile device 110 unlocks secure print jobs by capturing an image of a printed printer identification code (PIC) on an exposed surface of the selected printer using a camera on mobile device 110 when mobile device 110 is brought into proximity with the selected printer. Of course, prior to becoming locked on the selected printer, secure print jobs initiated on mobile device 110 may be temporarily stored in communication network 130 (e.g., on a print server).

Figure 2:
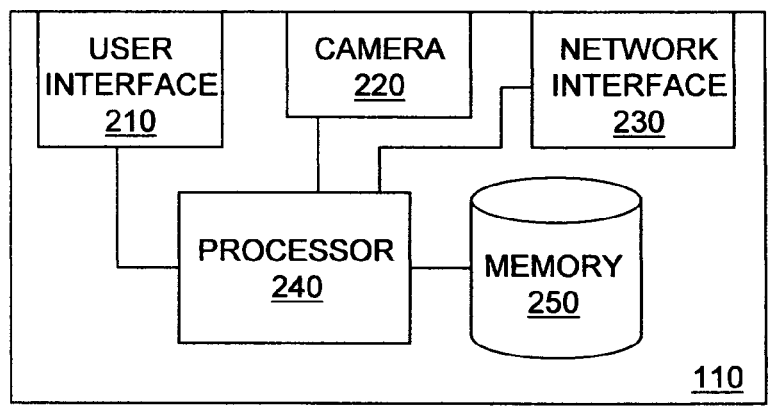
FIG. 2 is a block diagram of a mobile device in some embodiments of the invention.

Turning to FIG. 2, a block diagram of mobile device 110 is shown. Mobile device 110 is a tablet computer, smart phone, notebook computer or personal data assistant (PDA), for example. Mobile device 110 includes a user interface 210, a camera 220, a network interface 230 and a memory 250, all of which are communicatively coupled with a processor 240. User interface 210 has an input mechanism, such as a keyboard, keypad or touch screen for accepting inputs from a user and an output mechanism, such as a liquid crystal display (LCD) screen for displaying outputs to a user. User interface 210 may also have a microphone for receiving voice commands as inputs. Network interface 230 is a wired or wireless local area network (LAN) or metropolitan area network (MAN) interface, such as an Ethernet, Wi-Fi or WiMAX-compliant interface, or a cellular interface, that communicatively couples mobile device 110 with communication network 130. Memory 250 has one or more random access memory (RAM) elements and one or more read only memory (ROM) elements. Processor 240 executes software installed in memory 250 to carry-out operations on mobile device 110 including initiating, selecting a printer for, transmitting and managing secure print jobs in response to user inputs, processing and managing secure print job associated data, controlling camera 220 to capture images in response to user inputs and processing and managing image data captured by camera 220.

Figure 3:
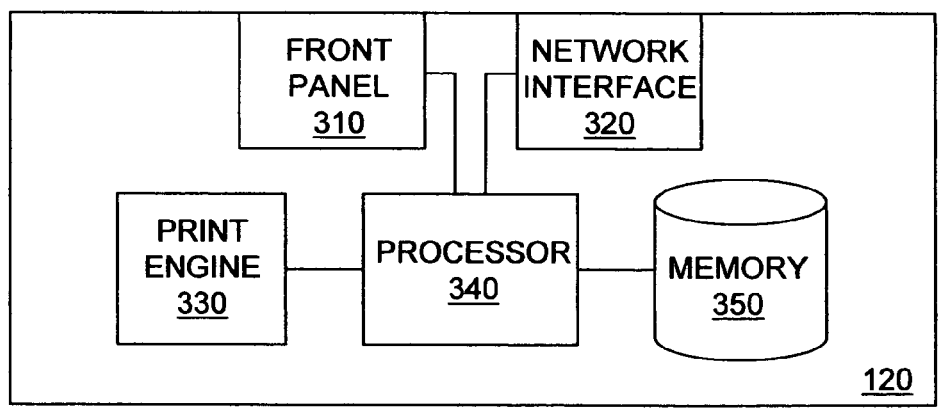
FIG. 3 is a block diagram of a printer in some embodiments of the invention.
Figure 6:
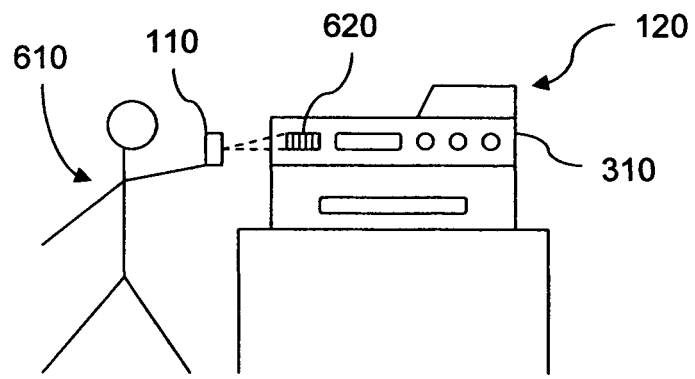
FIG. 6 is a concept sketch showing imaging of a printed PIC on a printer in some embodiments of the invention.

In FIG. 3, a block diagram of a printer 120, which is representative of printers 120A, 120B, 120C, is shown. Printer 120 is in some embodiments a multifunction peripheral (MFP) device that supports multiple imaging functions, such as printing, scanning and copying. Printer 120 has a front panel 310 for accepting inputs from walk-up users and displaying outputs to walk-up users. Turning momentarily to FIG. 6, front panel 310 is shown to have a printed printer identification code (PIC) 620 on an exposed surface. In some embodiments, printed PIC 620 is a barcode, symbol, token or other non-textual representation of a text string. In other embodiments, a printed PIC may consist entirely or partially of text. Printed PIC 620 is unique among printers 120A, 120B, 120C and is amenable to imaging by mobile device cameras. Moreover, while printed PIC 620 is designed for permanent and conspicuous display on printer 120 by being printed or etched directly on front panel 310 or by being printed or etched on a substrate (e.g., plate, sticker, etc.) affixed to front panel 310, other embodiments may rely on a PIC displayed on a front panel display screen in lieu of a printed PIC. Returning to FIG. 3, printer 120 also has a network interface 320 that communicatively couples printer 120 with communication network 130. Network interface 320 may be an Ethernet, Wi-Fi or WiMAX-compliant interface, for example. Internal to printer 120, front panel 310 and network interface 320 are communicatively coupled with a processor 340, which is also coupled with a memory 350 and print engine 330. Print engine 330 has printer logic, such as one or more integrated circuits (ICs), and an electromechanical section for performing printing functions. The electromechanical section may have, for example, a color ink jet head mounted on a movable carriage for printing a print element under the control of a printer IC, or a fusing system for fusing liquefied toner to paper to print a print element under control of a printer IC. Printer 120 may also have other engines, such as a scan/copy engine having scanner/copier logic, such as one or more ICs, and an electromechanical section for performing a scanning and copying functions. The electromechanical section may have, for example, a line image sensor mounted on a movable carriage for optically scanning a document under the control of a scanner IC and storing the scanned document into memory 350. While in the illustrated embodiment a printer that supports printing, scanning and copying is described, in other embodiments of the invention a printer that supports additional or different imaging-related functions, such as faxing and filing, or a single-function printing device, may be employed. Memory 350 includes one or more RAM elements and one or more ROM elements. Processor 340 executes software installed in memory 350 to carry-out operations on printer 120 including receiving, storing and locking secure print jobs received on network interface 320 from mobile device 110, processing and managing job identifiers assigned to secure print jobs and unlocking and printing and/or canceling secure print jobs in accordance with requests and job identifiers received on network interface 320 from mobile device 110.

Figure 4:
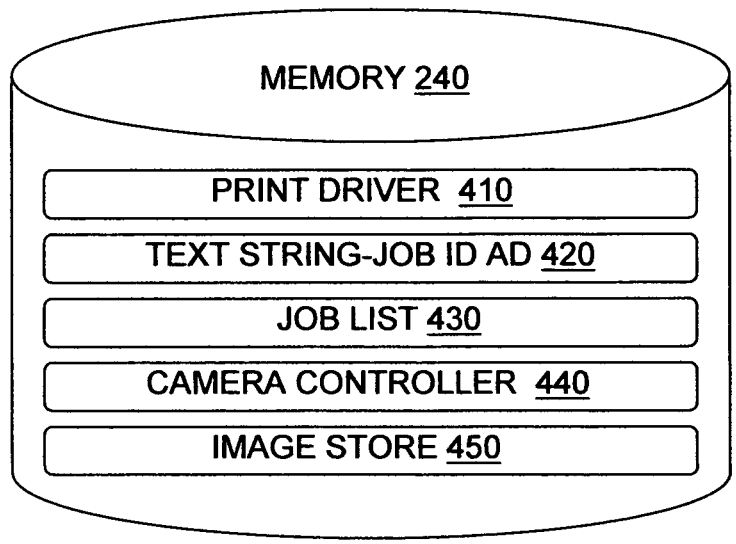
FIG. 4 is a block diagram showing software and data storage elements operative on a mobile device in some embodiments of the invention.

FIG. 4 shows software and data storage elements housed in memory 240 on mobile device 110 in some embodiments of the invention. Print driver 410 and camera controller 440 are software modules executable by processor 240. Text string-job identifier associated data 420 and job list 430 are data structures managed by print driver 410. Image store 450 is a data structure managed by print driver 410 and camera controller 440.

Figure 5:
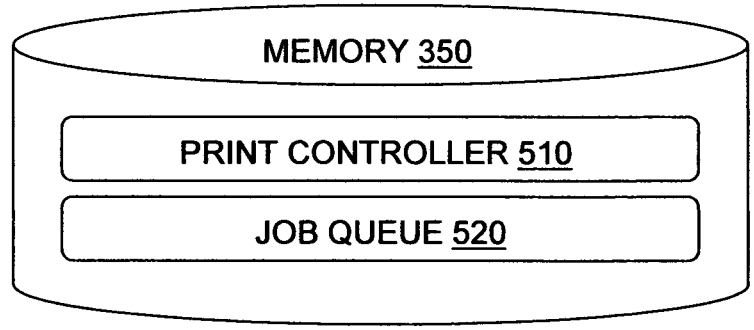
FIG. 5 is a block diagram showing software and data storage elements operative on a printer in some embodiments of the invention.

FIG. 5 shows software and data storage elements housed in memory 350 on printer 120 in some embodiments of the invention. Print controller 510 is a software module executable by processor 340. Job queue 520 is a data structure managed by print controller 510.

Figure 7:
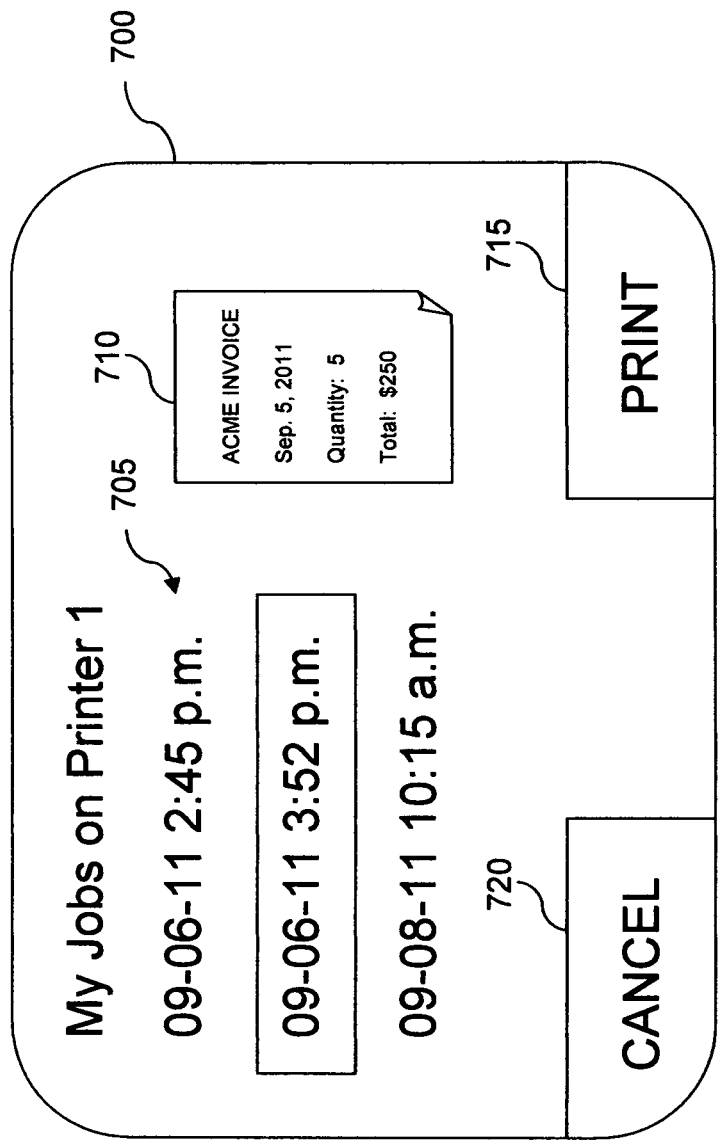
FIG. 7 is an exemplary user screen displayed on a mobile device in some embodiments of the invention.
Figure 8:
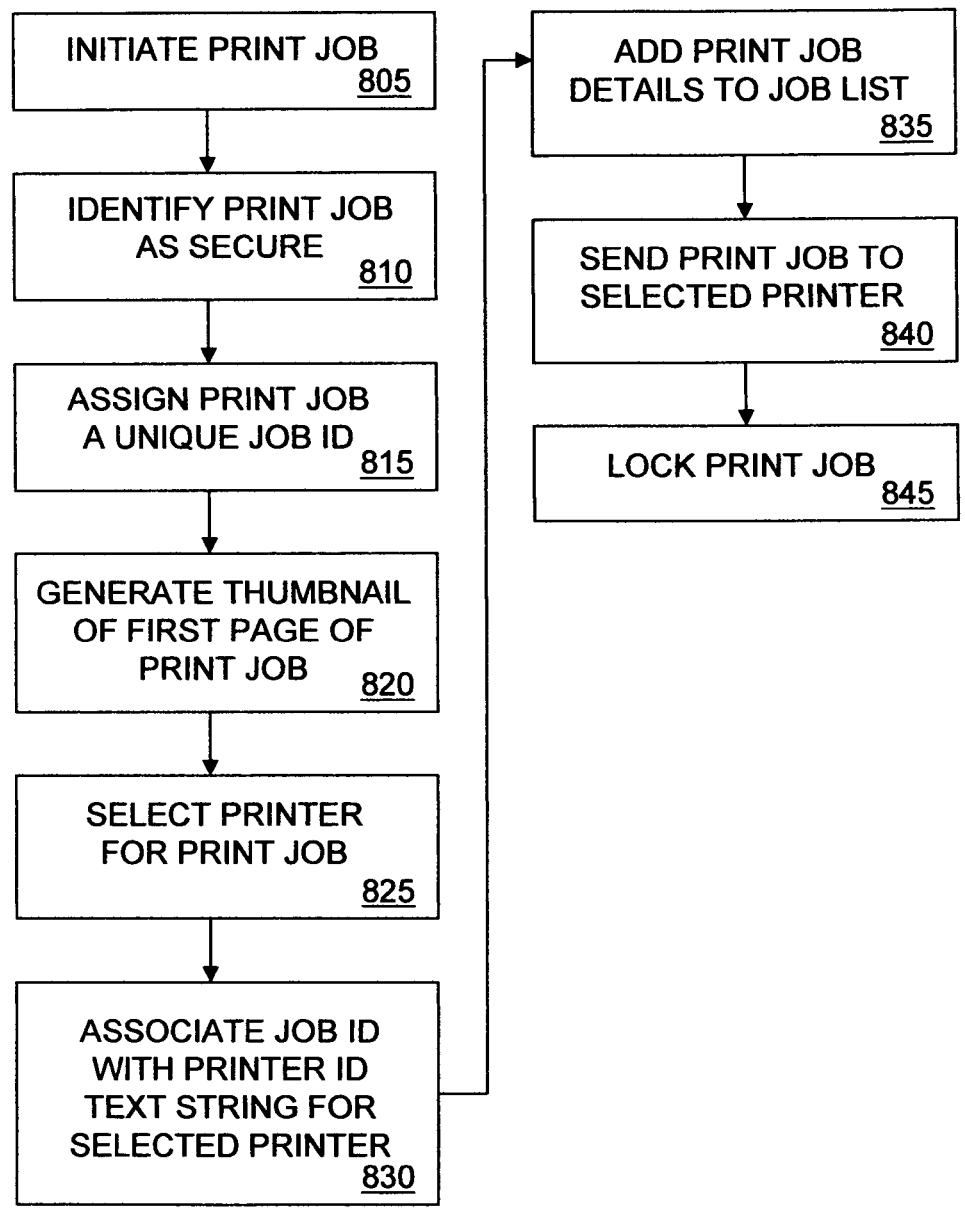
FIG. 8 is a flow diagram showing method steps whereby a secure print job is initiated on a mobile device and locked on a selected printer in some embodiments of the invention.

Interaction of the elements of FIGS. 4 and 5 will now be described in conjunction with FIGS. 6-10. Turning first to FIG. 8, method steps whereby a secure print job is remotely initiated on mobile device 110 and locked on printer 120 are shown in some embodiments of the invention. At the outset, a print job is initiated on mobile device 110 in response to inputs by user 610 on user interface 210 (805). The initiation inputs by user 610 invoke print driver 410 and identify a document (e.g., MS-Word document, MS-PowerPoint presentation, web page, etc.) to be printed and print settings for the document. By way of example, the document to be printed may be a black-and-white sales invoice or a color sales brochure.

Next, the print job is identified on mobile device 110 as a secure print job in response to inputs on user interface 210 (810). The secure identification inputs by user 610 cause print driver 410 to apply access control restrictions described herein to the print job. In some embodiments, where a print job is not identified as a secure print job, it may be printed without the access control restrictions described herein. In other embodiments, a print job is treated as a secure print job unless user 610 identifies the print job as an unsecured print job. In still other embodiments, all print jobs initiated on mobile device 110 are treated as secure print jobs without regard to any secure/unsecured identification inputs.

Next, the secure print job is assigned by print driver 410 a job identifier that is unique among print jobs (815). In some embodiments, the job identifier is a random number generated by print driver 410. In other embodiments, the job identifier is a concatenation of an identifier associated with mobile device 110, such as a phone number, subscriber identification module (SIM) card number or device serial number, and a random number selected by print driver 410.

Next, a thumbnail image of the first page of the document to be printed is generated by print driver 410 (820).

Next, a printer 120 is selected from among multiple printers 120A, 120B, 120C to handle the secure print job in response to inputs on user interface 210 (825). For example, where the document to be printed is a black-and-white sales invoice, user 610 may select a monochrome printer named SHARP-BW-01 to handle the secure print job. Where the document to be printed is a color sales brochure, user 610 may select a color printer named SHARP-COLOR-05 to handle the secure print job. The selection inputs by user 610 cause print driver 410 to designate printer 120 as the selected one of printers 120A, 120B, 120C that will receive, store and lock the print job.

Next, a record is created by print driver 410 in text string-job identifier associated data 420 associating the job identifier assigned to the secure print job with a printer identification text string of printer 120 (830). Each of printers 120A, 120B, 120C has a printer identification text string that is unique among printers 120A, 120B, 120C. For example, printer 120A may be uniquely identified by the text string \\AMDSRVNT01\SharpMX500. For every secure print job, print driver 410 creates a record in text string-job identifier associated data 420 that associates the job identifier assigned to the print job with the printer identification text string of the one of printers 120A, 120B, 120C selected to handle the print job.

Next, a record is created by print driver 410 in job list 430 containing details of the secure print job (835). For every secure print job, print driver 410 creates a record in job list 430 that associates the job identifier assigned to the print job with relevant data such as the initiation date of the print job, the initiation time of the print job, the identifier of the selected printer (which may be the text string or another identifier) and the thumbnail image of the first page of the print job. Other and further job relevant data may be recorded, such as the number of pages in the print job. In some embodiments, job list 430 is stored in nonvolatile memory so that job list 430 is preserved during periods when mobile device 110 is not powered.

Finally, the secure print job and the job identifier are sent to printer 120 via network interface 230 (840), whereupon the print job is locked on printer 120 (845). At printer 120, the secure print job and the job identifier are received via network interface 320, whereupon print controller 510 stores the print job in association with job identifier in job queue 520 in a locked state. While in the locked state, the print job cannot be printed and cannot be canceled.

The method steps shown in FIG. 8 may be repeated for additional secure print jobs initiated on mobile device 110 while user 610 is away from the office, resulting in multiple secure print jobs remotely submitted by mobile device 110 being stored in a locked state on one or more of printers 120A, 120B, 120C.

Figure 9:
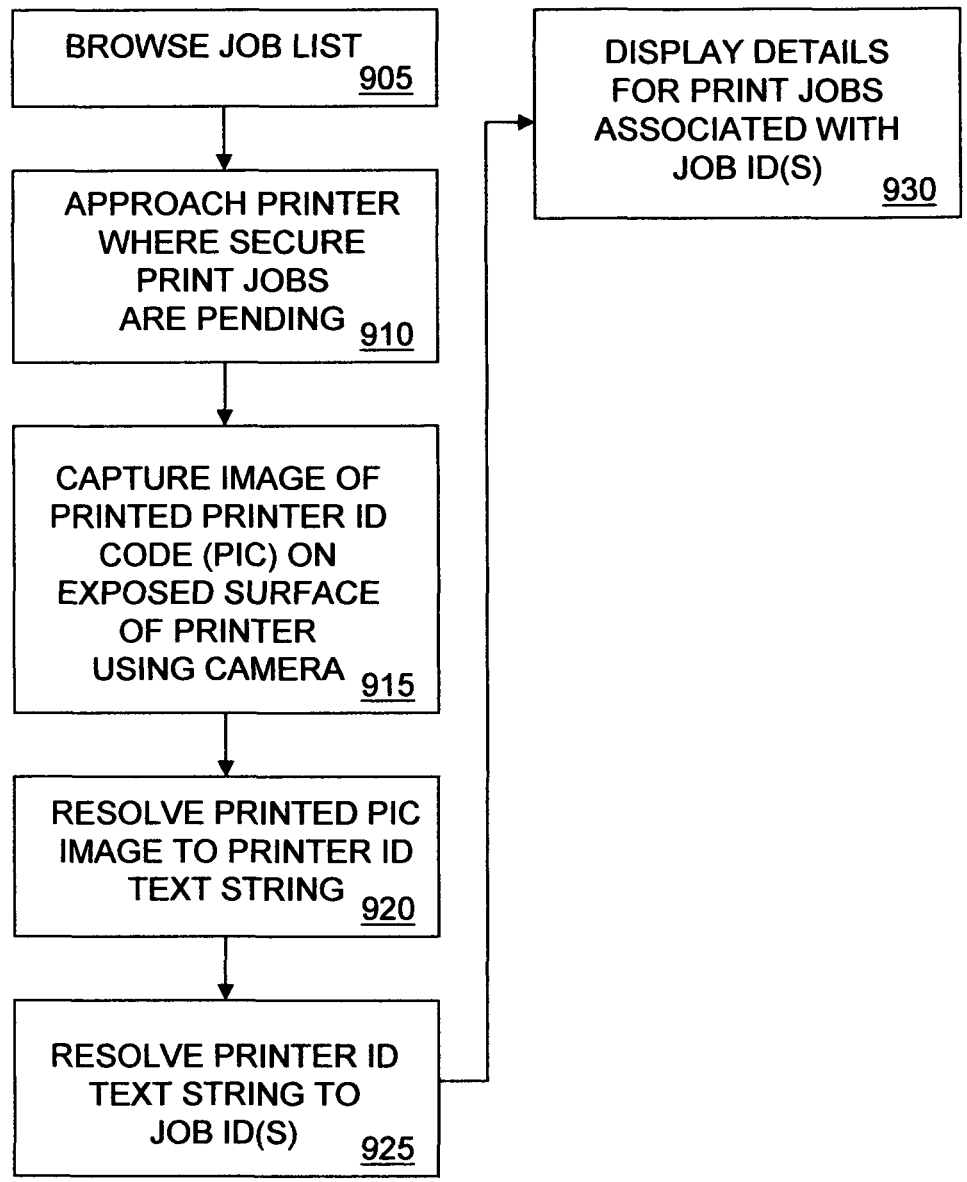
FIG. 9 is a flow diagram showing method steps whereby secure print jobs locked on a selected printer are identified on a mobile device by imaging a printed PIC on the selected printer in some embodiments of the invention.

Turning next to FIG. 9, method steps whereby secure print jobs locked on printer 120 are identified on mobile device 110 by imaging of a printed PIC on printer 120 are shown in some embodiments of the invention. These method steps are typically performed after user 610 has returned to the corporate office where printers 120A, 120B, 120C are located.

First, records stored in job list 430 are displayed on user interface 210 and browsed in response to inputs on user interface 210 (905). These inputs by user 610 cause print driver 410 to retrieve from job list 430 and output on user interface 210 records of secure print jobs remotely submitted to printers 120A, 120B, 120C by mobile device 110. Each displayed record may include, for example, the initiation date of the print job, the initiation time of the print job, an identifier of the selected printer and the thumbnail image of the first page of the print job. The displayed records may be useful to refresh the memory of user 610 as to which printers 120A, 120B, 120C user 610 sent secure print jobs while away from the office.

Returning to FIG. 6, user 610 approaches printer 120 to which one or more secure print jobs remotely submitted from mobile device 110 were sent (910). Once user 610 is in the proximity of printer 120, user 610 manipulates mobile device 110 to place printed PIC 620 in the field of view of camera 220. Camera controller 440 then controls camera 220 in response to inputs on user interface 210 to capture an image (i.e., take a digital photograph) of printed PIC 620 (915), which camera controller 440 stores in image store 450.

Next, the printed PIC image is resolved by print driver 410 to a printer identification text string (920). In some embodiments, the printed PIC image stored in image store 450 is called out for resolution by user 610 through inputs on user interface 210. Print driver 410 compares the printed PIC image for conformance with predetermined symbologies and translates the printed PIC image into a printer identification text string. For example, where printer 120 is uniquely identified by the text string \\Adm88\SharpColorC8, print driver 410 resolves the printed PIC image captured from printed PIC 620 to the text string \\Adm88\SharpColorC8 through conformance with predetermined symbologies.

In other embodiments, mobile device 110 has an integral bar code scanner that scans printed PIC 620 when placed in proximity to printed PIC 620. In these embodiments, scanned barcode data captured by the barcode scanner is resolved to the printer identification text string.

Next, the printer identification text string is resolved by print driver 410 to job identifiers of secure print jobs locked on printer 120 (925). Print driver 410 uses the printer identification text string as an index into text string-job identifier associated data 420 to retrieve the job identifiers of the one or more secure print jobs sent by mobile device 110 to printer 120 and locked on printer 120.

Finally, details of the secure print jobs sent by mobile device 110 to printer 120 are retrieved by print driver 410 from job list 430 using the resolved job identifiers and displayed on user interface 210 (930). For each print job, the displayed details may include the initiation date of a print job, the initiation time of the print job and the thumbnail image of the first page of the print job. Turning to FIG. 7, an exemplary user screen 700 displaying such records is shown in some embodiments of the invention. User screen 700 provides details 705 for print jobs including initiation date and time. Moreover, a thumbnail image 710 of the first page of the document is shown for the print job that is presently in focus. User screen 700 also has a print button 715 and a cancel button 720. At this point, user 610 can change the focus (if required) to a print job of interest and press buttons 715, 720 to unlock and print or cancel the print job without having to input the job identifier assigned to the print job.

Figure 10:
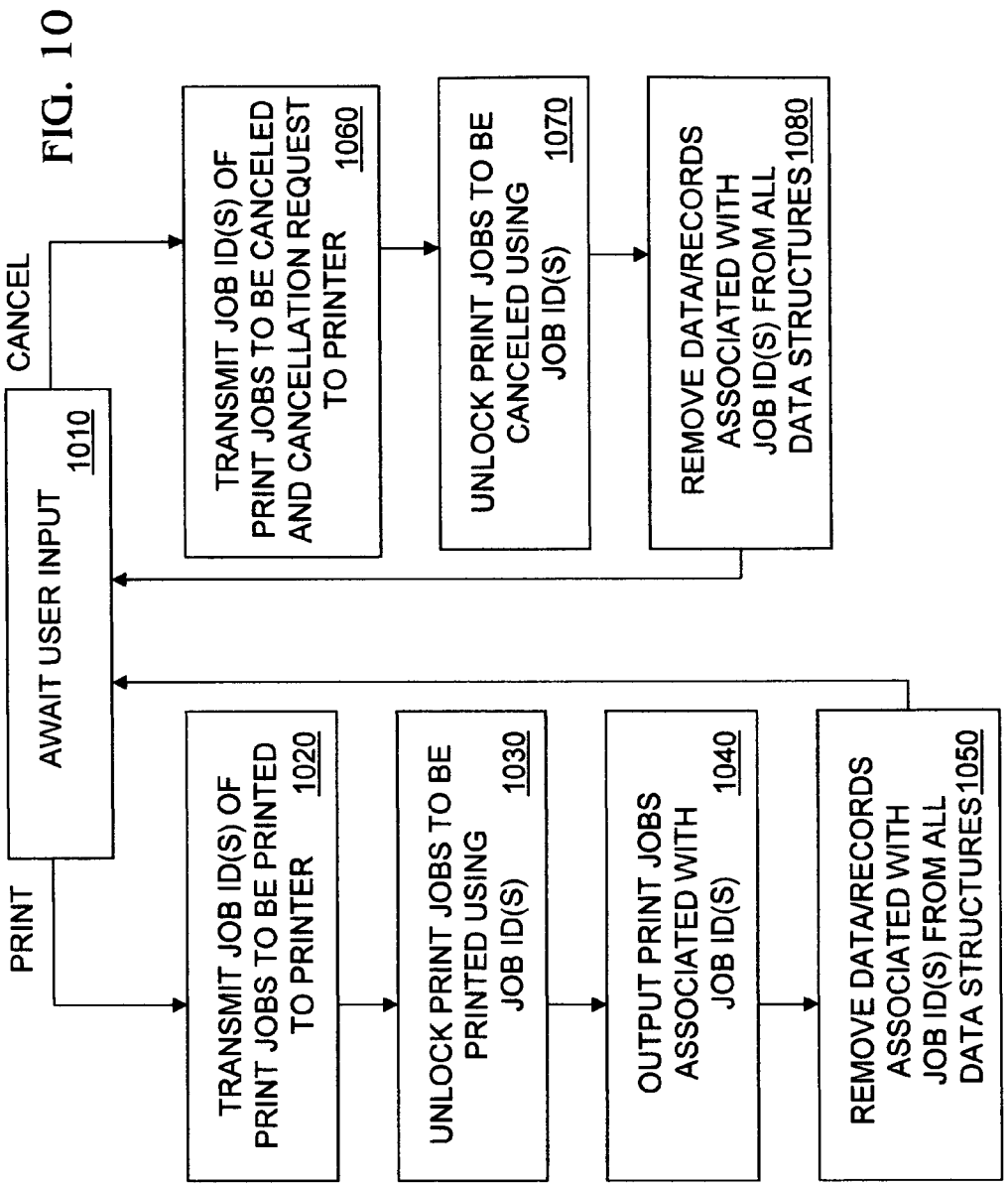
FIG. 10 is a flow diagram showing method steps whereby a secure print job locked on a selected printer is unlocked by a mobile device and processed in some embodiments of the invention.

FIG. 10 shows method steps whereby a secure print job locked on printer 120 is unlocked by mobile device 110 and processed in some embodiments of the invention. The method steps will be described by reference to user screen 700. Initially, mobile device 110 displays user screen 700 and awaits input from user 610 (1010). If user 610 presses print button 715, the job identifier of the secure print job that is presently in focus (e.g., Sep. 6, 2011, 3:52 p.m.) is sent to printer 120 via network interface 230 along with a print instruction (1020). Upon receiving the job identifier and print instruction, print controller 510 unlocks the print job in job queue 520 using the job identifier (1030), prints the print job (1040) and removes the print job from job queue 520 (1050). Print driver 410 also removes the print job details from job list 430 (1050), either upon sending the print instruction to printer 120 or upon receiving an acknowledgment from printer 120 that the print job has been printed (1050). Naturally, user 610 may print multiple jobs with one print instruction by pressing print button 715 while multiple print jobs are presently in focus.

If user 610 presses cancel button 720, the job identifier of the secure print job that is presently in focus (e.g., Sep. 6, 2011, 3:52 p.m.) is sent to printer 120 via network interface 230 along with a cancel instruction (1060). Upon receiving the job identifier and cancel instruction, print controller 510 unlocks the print job in job queue 520 using the job identifier (1070), cancels the print job (1080) and removes the print job from job queue 520 (1090). Print driver 410 also removes the print job details from job list 440 (1090), either upon sending the cancel instruction to printer 120 or upon receiving an acknowledgment from printer 120 that the print job has been cancelled (1050). Naturally, user 610 may cancel multiple jobs with one cancel instruction by selecting cancel button 720 while multiple print jobs are presently in focus. Moreover, in some embodiments, user 610 may cancel (but not print) secure print jobs without first capturing the image of printed PIC 620.

It will be appreciated by those of ordinary skill in the art that the invention can be embodied in other specific forms without departing from the spirit or essential character hereof. The present description is thus considered in all respects to be illustrative and not restrictive. The scope of the invention is indicated by the appended claims, and all changes that come with in the meaning and range of equivalents thereof are intended to be embraced therein.

What is claimed is:

1. A secure mobile printing method, comprising the steps of:
   initiating on a mobile device a print job;
   assigning on the mobile device a job identifier for the print job;
   selecting on the mobile device from a plurality of printers a printer for the print job;
   sending from the mobile device to the selected printer the print job and the job identifier whereby the print job is locked on the selected printer;
   taking using a camera on the mobile device a digital photograph of a printer identification code (PIC) identifying the selected printer formed permanently on an exposed surface of the selected printer;
   processing on the mobile device the photograph whereby the PIC is resolved to a text string identifying the selected printer;
   resolving on the mobile device the text string to the job identifier and at least one other job identifier associated with at least one other print job sent from the mobile device to the selected printer and locked on the selected printer;

displaying simultaneously on the mobile device details of the locked print jobs, the details comprising initiation date and time information for the locked print jobs, a visual selection indicator identifying a selected print job among the locked print jobs through focus on details of the selected print job and a thumbnail image from the selected print job; and receiving on the mobile device a print request for the selected print job whereby the job identifier of the selected print job is sent from the mobile device to the selected printer and the selected print job is unlocked on the selected printer.

2. The method of claim 1, further comprising the step of printing the unlocked print job on the selected printer.

3. The method of claim 1, further comprising the step of identifying on the mobile device the initiated print job as a secure print job.

4. The method of claim 1, wherein the PIC is a barcode.

5. A mobile device, comprising:
a processor;
a user interface communicatively coupled with the processor;
a network interface communicatively coupled with the processor; and
a camera communicatively coupled with the processor, wherein in response to input on the user interface the mobile device is configured under control of the processor to initiate a print job, assign a job identifier for the print job, select from a plurality of printers a printer for the print job and send to the selected printer via the network interface the print job and the job identifier whereby the print job is locked on the selected printer, and wherein in response to further input on the user interface the camera is configured under control of the processor to take a digital photograph of a printer identification code (PIC) identifying the selected printer formed permanently on an exposed surface of the selected printer whereupon the mobile device is configured under control of the processor to process the photograph whereby the PIC is resolved to a text string identifying the selected printer, resolve the text string to the job identifier and at least one other job identifier associated with at least one other print job sent from the mobile device to the selected printer and locked on the selected printer, display simultaneously on the user interface details of the locked print jobs, the details comprising initiation date and time information for the locked print jobs, a visual selection indicator identifying a selected print job among the locked print jobs through focus on details of the selected print job and a thumbnail image from the selected print job, and receive on the user interface a print request for the selected job whereby the job identifier of the selected print job is sent to the selected printer via the network interface and the print job is unlocked on the selected printer.

* * * * *